US 6,659,343 B2

(12) United States Patent
Tanaka

(10) Patent No.: US 6,659,343 B2
(45) Date of Patent: Dec. 9, 2003

(54) IC CARD AND IC CARD DATA COMMUNICATION METHOD

(75) Inventor: Katsuyuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 09/901,268

(22) Filed: Jul. 9, 2001

(65) Prior Publication Data
US 2002/0014529 A1 Feb. 7, 2002

(30) Foreign Application Priority Data
Jul. 10, 2000 (JP) ..................................... P2000-213383

(51) Int. Cl.[7] ................................................. G06K 5/00
(52) U.S. Cl. ........................ 235/380; 235/449; 235/451; 340/10.51
(58) Field of Search ................................ 235/380, 449, 235/451, 450, 492, 379; 902/26, 37, 39, 40; 705/39, 41, 44, 17; 340/505, 539.11, 5.6, 5.61, 5.64, 5.4, 5.41, 10.1, 10.51, 825.72

(56) References Cited

U.S. PATENT DOCUMENTS

| 4,625,276 A | * 11/1986 | Benton et al. ................ 705/44 |
| 5,120,939 A | * 6/1992 | Claus et al. ............. 235/380 X |
| 5,461,217 A | * 10/1995 | Claus ......................... 235/380 |
| 5,691,525 A | * 11/1997 | Aoki et al. ............. 238/380 X |
| 5,748,737 A | 5/1998 | Daggar ......................... 705/41 |
| 5,841,119 A | 11/1998 | Rouyrre et al. ............. 235/380 |
| 5,854,581 A | * 12/1998 | Mori et al. ............. 235/380 X |
| 6,010,066 A | * 1/2000 | Itou et al. .................... 235/379 |
| 6,112,985 A | * 9/2000 | Weinlaender ............... 235/380 |
| 6,352,202 B2 | * 3/2002 | Takiguchi et al. .......... 235/451 |
| 6,394,343 B1 | * 5/2002 | Berg et al. .................. 235/379 |
| 6,425,522 B1 | * 7/2002 | Matsumoto et al. ........ 235/380 |
| 6,502,748 B2 | * 1/2003 | Berg et al. .................. 235/379 |

FOREIGN PATENT DOCUMENTS

| EP | 0 534 559 A1 | 3/1993 |
| EP | 0 668 579 A2 | 8/1995 |
| EP | 0 867 843 A2 | 9/1998 |
| EP | 0 878 891 A2 | 11/1998 |
| JP | 4-80811 A | * 3/1992 |
| JP | 7-325895 A | * 12/1995 |
| WO | WO 99/53449 | 10/1999 |

* cited by examiner

Primary Examiner—Jared J. Fureman
(74) Attorney, Agent, or Firm—Bell, Boyd & Lloyd LLC

(57) ABSTRACT

Disclosed is a data communication system and method for communicating data between a first integrated circuit card having a first antenna and a first memory and a second integrated circuit card having a second antenna and a second memory, wherein the first antenna is magnetically coupled with the second antenna through a device having an antenna to transmit data from the first memory to the second memory.

38 Claims, 6 Drawing Sheets

LOOP ANTENNA

LOOP ANTENNA

IC CARD AND IC CARD DATA COMMUNICATION METHOD

BACKGROUND OF THE INVENTION

The present invention relates generally to an IC card and an IC card data communication method. Especially, the present invention is applicable to non-contact type IC cards.

With an IC card of non-contact type, various data are recorded and read out by use of a dedicated reader/writer.

Referring to FIG. 6, there is shown a schematic diagram illustrating a relationship between an IC card and a reader/writer. An IC card 1 is constituted by a wiring board on which a loop antenna 2 and an integrated circuit 3 are arranged and a sheet material such as a plastic, which are laminated into a sheet. With the IC card 1, the integrated circuit 3 is operated by a high-frequency signal power induced on the loop antenna 2, thereby transferring various data with a reader/writer 5 via the loop antenna 2.

With the reader/writer 5, a loop antenna 6 is driven by a predetermined driver circuit and, when the IC card 1 turns on, a high-frequency signal is induced on its loop antenna 2, thereby starting the operation of the IC card 1. Also the reader/writer 5 is adapted to transfer commands and data with the IC card 1 by switching the driving of the loop antenna 6 by a modulation/demodulation circuit 7 and processing the high-frequency signal obtained by the loop antenna 6 under the control of a DPU (Digital Processing Unit) 8.

To be more specific, referring to FIG. 7, a signal generation circuit 9 in the reader/writer 5, generates a high-frequency signal of 13.56 MHz, for example, under the control of the DPU 8 and drives the loop antenna 6 with this signal. The DPU 8 instructs the signal generation circuit 9 to start its operation in response to a request from a host device, outputs various data to be sent to the IC card 1 to the modulation/demodulation circuit 7, and captures various data received at the modulation/demodulation circuit 7. Repeating these processes, the DPU 8 executes the processing such as mutual-authentication with the IC card 1, records data received from the host device to the IC card 1, and reads data recorded to the IC card 1 to output the data to the host device.

The modulation/demodulation circuit 7 modulates the output data of the DPU 8, varies the terminal impedance of the antenna 6 on the basis of the modulation result, and thereby sends the modulated output data to the IC card 1. Also, the modulation/demodulation circuit 7 processes the high-frequency signal at the loop antenna 6 with the terminal impedance of the loop antenna 6 kept to a constant value, thereby detecting an impedance variation at the loop antenna 2 of the IC card 1 coupled to the loop antenna 6. The modulation/demodulation circuit 7 receives the data sent from the IC card 1 and outputs the received data to the DPU 8.

In the IC card 1, the high-frequency signal induced on the loop antenna 2 is detected by a low-pass filter formed by a diode 11, a resistor 12, and a capacitor 13 incorporated in the integrated circuit 3. A power supply circuit 14 rectifies the received detected high-frequency signal and stabilizes the rectified signal to generate an operating power supply.

The modulation/demodulation circuit 15 receives the detection result via a high-pass filter formed by a capacitor 16 and a resistor 17 and processes the received detection result to demodulate the data transmitted by the reader/writer 5. Further, the modulation/demodulation circuit 15 modulates output data from a sequencer 19 under the control thereof, thereby controlling the on/off of a field-effect transistor FET on the basis of the modulation result. The on/off control causes the FET to ground load Z connected to the anode of the diode 11. Consequently, in the IC card 1, the terminal impedance of the loop antenna 2 coupled with the loop antenna 6 of the reader/writer 5 is switched, transmitting various data to the reader/writer 5.

The sequencer 19 starts operating on the power supplied from the power supply circuit 14 to output various data to the modulation/demodulation circuit 15 in accordance with the data supplied from the reader/writer 5 detected by the modulation/demodulation circuit 15. Consequently, the IC card 1 approaches the reader/writer 5 and starts operating. Detecting a polling from the reader/writer 5, the IC card 1 executes processing such as mutual-authentication. After a series of these operations, the sequencer 19 accesses a memory 20 in accordance with the data supplied from the modulation/demodulation circuit 15 to update the contents of the memory 20 and output the updated data to the modulation/demodulation circuit 15.

Consequently, the system based on the IC card 1 is available as a room access control means by storing the personal information of each user into his IC card 1 and as a credit card by recording purchase log information for example about various commercial articles to the IC card 1.

It is possible to use IC cards as entrance tickets for various event places. In this case, the purchase of an entrance ticket for an event place is recorded on the IC card by online access for example before entering the event. Therefore, the organizer of the event can easily and surely manage the entries by checking the recording of their IC cards at the entrance of the event place. This also allows the users to purchase desired entrance tickets from remote places.

However, the use of IC cards as entrance tickets requires copying a part of each IC card to another with security.

Namely, tickets which are issued in paper may be purchased in bulk for distribution. If the IC cards used as entrance tickets are purchased in bulk, it is possible that the entrance tickets purchased in bulk are recorded in one IC card. If this happens, the record in such an IC card must be copied to other IC cards to distribute the entrance tickets.

If the copying of a part of an IC card to others is performed by means of a reader/writer, unauthorized copies may take place. It is therefore necessary to perform the copying as securely as possible.

If an IC card is used as a credit card, the IC card may be periodically updated to a new one. If the IC card is updated, the information, such as a purchase log recorded to this IC card, must be all copied to a new IC card and as securely as possible.

SUMMARY OF THE INVENTION

An advantage of the present invention to provide an IC card and an IC card data communication method for securely copying the contents of one IC card to another. To be more specific, the present invention is intended to directly exchange data between IC cards by use of the coupling between the antennas of the IC cards via the antenna of a reader/writer, thereby securely copying the contents of one IC card onto another IC card.

According to one embodiment of the present invention, there is provided a data communication method for communicating data between a first IC card having a first antenna and a first memory and a second IC card having a second antenna and a second memory, wherein the first antenna is magnetically coupled with the second antenna through a device having an antenna to transmit data from the first memory to the second memory.

With this configuration, data is directly transferred between IC cards by use of the electromagnetic coupling of their antennas by use of the antenna of a reader/writer. Consequently, the contents of one IC card can be copied to another in security.

Various features and advantages of the present invention will become apparent from this description and the appended claims, taken in conjunction with the accompanying drawings in which like parts or elements are denoted by like reference symbols. The features and advantages may be desired, but not necessarily required to practice the present invention.

DETAILED DESCRIPTION OF PREFERRED EMBODIMENTS

This invention will be described in further detail by way of example with reference to the accompanying drawings.

Figure 1:
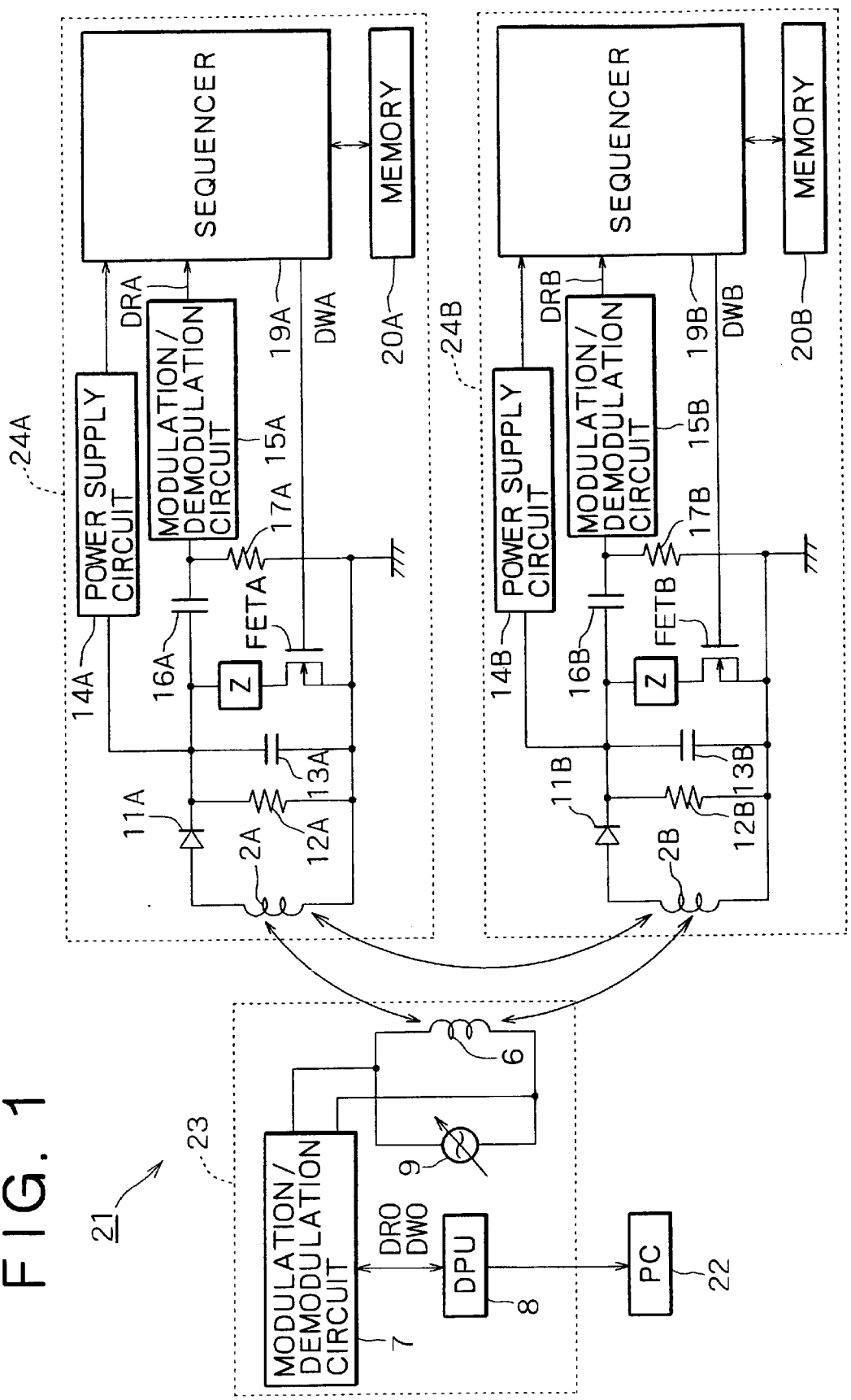
FIG. 1 is a block diagram illustrating an IC card system associated with a first embodiment of the invention.

Referring to FIG. 1, there is shown a block diagram illustrating an IC card system practiced as a first embodiment of the invention. In an IC card system 21, a reader/writer 23 is configured in the same manner as the related-art reader/writer 5 described before with reference to FIGS. 6 and 7. An IC card 24A and an IC card 24B are configured in generally the same manner as the IC card 1 described before with reference to FIGS. 6 and 7, except for the data stored in a memory 20A and a memory 20B.

Figure 6:
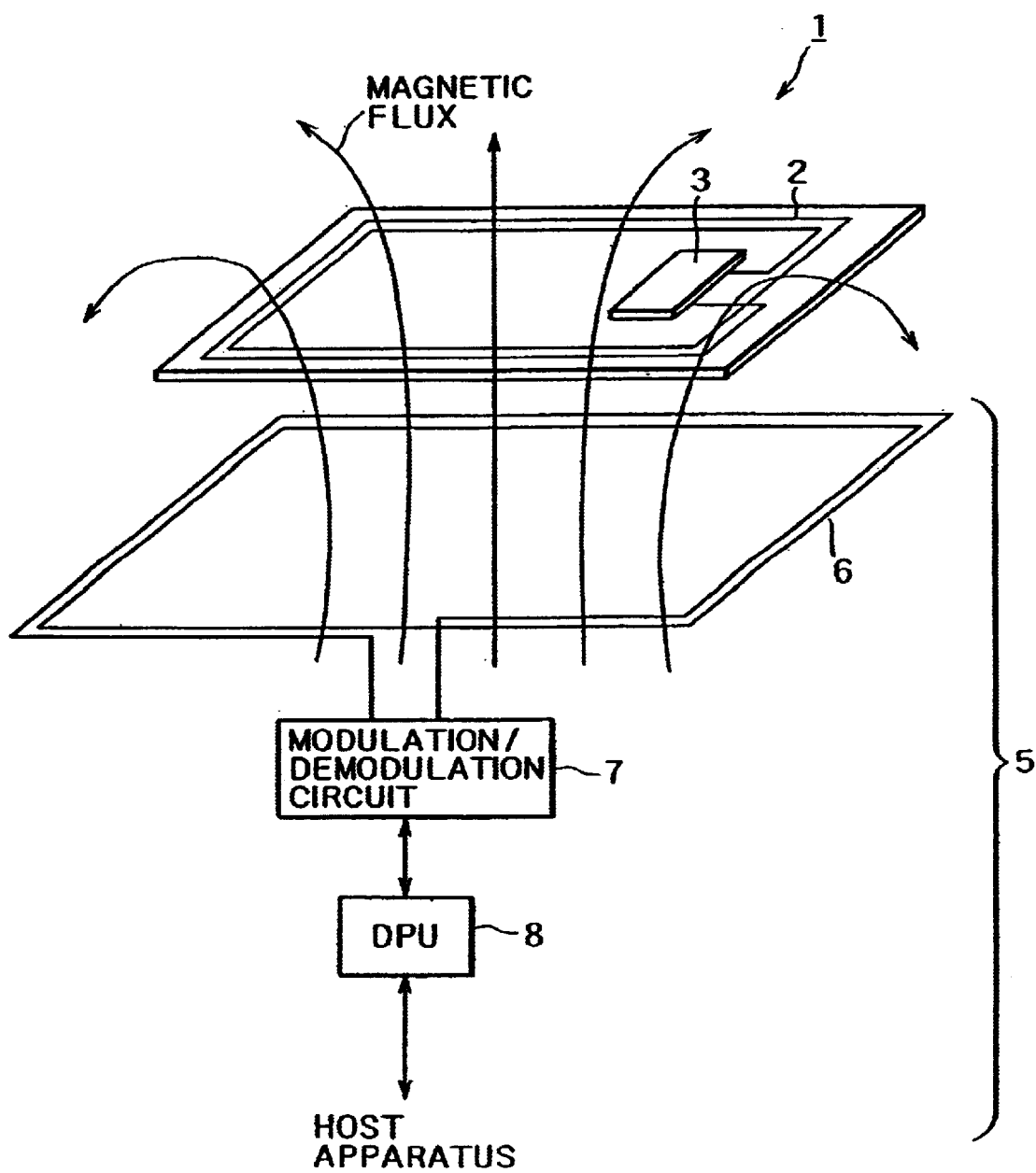
FIG. 6 is a schematic diagram illustrating a prior-art IC card system.
Figure 7:
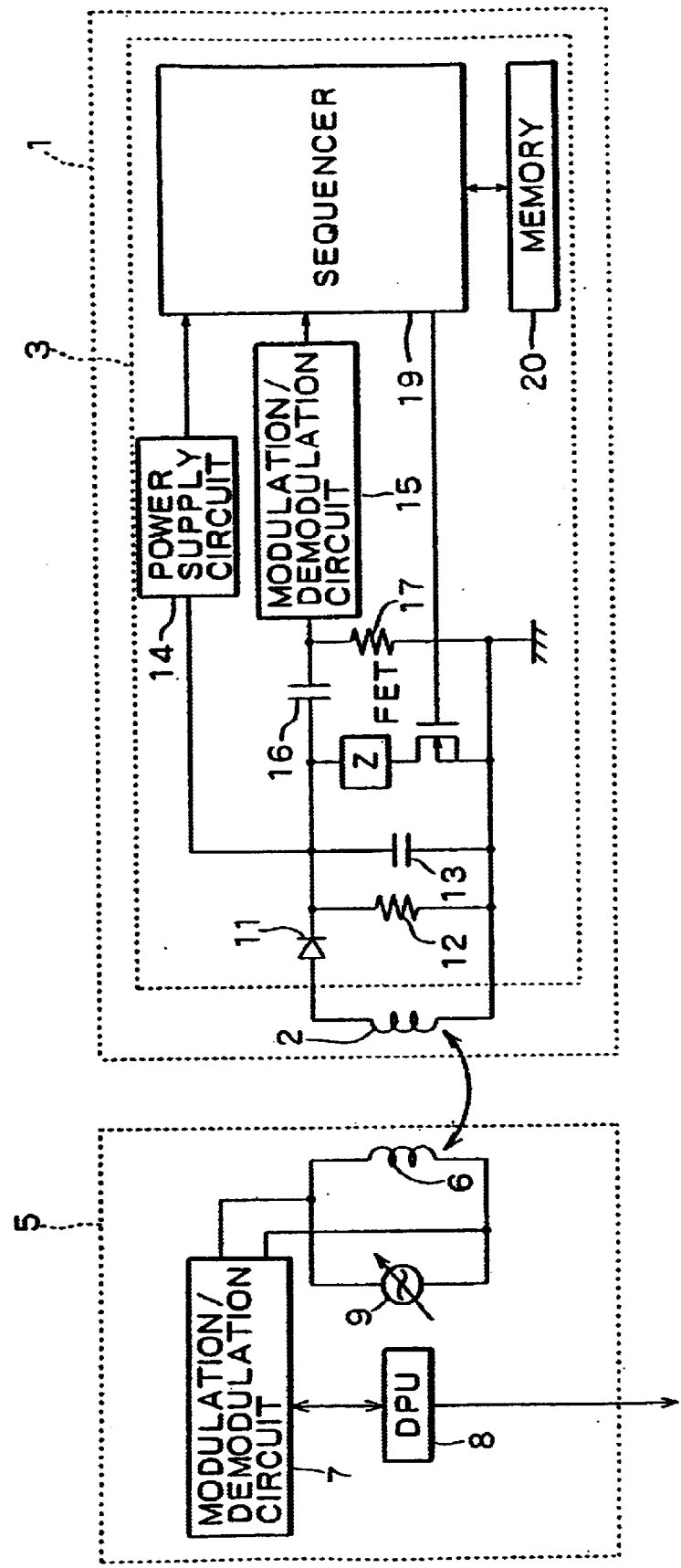
FIG. 7 is a block diagram illustrating a detailed configuration of the related-art IC card system shown in FIG. 6.

To be more specific, the IC card 24A is loaded alone in the reader/writer 5 as described with reference to FIG. 6 and a predetermined application program of a personal computer, which is a host unit of the IC card system, is executed to store the purchase record about the entrance ticket for an event desired by the user into the memory 20A. Consequently, the user can carry the IC card 24A and pass an entrance gate arranged with a reader/writer to the event like passing a ticket barrier in a railway station.

As such an entrance ticket purchase record, the IC card 24A stores data for identifying the event, data for identifying the seat if the event is a music concert, for example, and data for identifying the purchase action, such as a purchase number along with data for providing security by the data unique to these data. If a plurality of tickets have been purchased in bulk, these data are recorded for each of the purchased tickets as purchase records and, in addition to these data, data about the number of tickets purchased is recorded. Further, processing-restricting data is added to the IC card 24A, as an entrance ticket purchase record, indicative that all of the above-mentioned data are readable only for direct data transfer between IC cards, that is, the reader/writer 5 may only browse the data for identifying the event and seat and the number of purchased tickets but cannot read the security data.

Further, the IC cards 24A and 24B store, in their memories 20A and 20B in a protected manner, commands and their sequences for transferring data having processing-restricting data to the IC card 24B. Moreover, the IC cards 24A and 24B allocate codes, for commands used for these sequences, different from those for commands transferred with the reader/writer 23, thereby preventing the reader/writer 23 from knowing the sequence of processes being made between the cards.

In the IC card system 21, when a predetermined application program for making the tickets bulk purchased by the IC card 24A be available in the IC card 24B is started in a personal computer 22, the user is prompted on a display screen of the personal computer 22 to load the IC card 24A in a predetermined position of the reader/writer 23 and the personal computer 22 issues a start command to the reader/writer 23.

Figure 2:
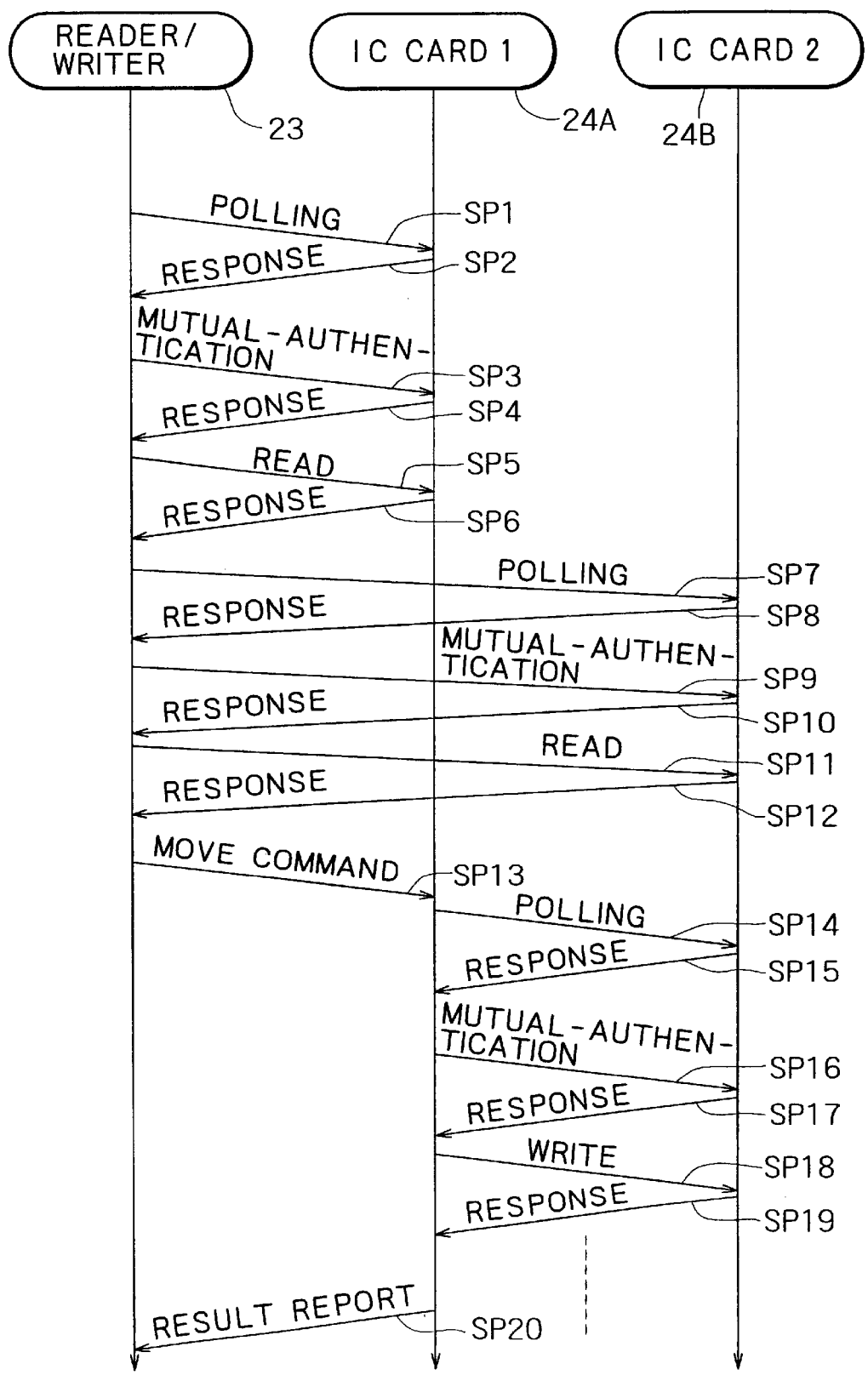
FIG. 2 is a timing chart describing data exchange operations between an IC card and a reader/writer.

Receiving the start command, the reader/writer 23 starts the loop antenna 6 by high-frequency signal, which starts the operation of the IC card 24A when the IC card 24A is placed near the reader/writer 23. As shown in steps SP1 through SP6 in FIG. 2, the reader/writer 23 issues a polling to the IC card 24A. When the IC card 24A responds, the reader/writer 23 performs mutual-authentication with the IC card 24A. When mutual-authentication is completed, the reader/writer 23 sends a read command for reading the ticket-associated data to the IC card 24A under the control of the personal computer 22. In response to the read command, the IC card 24A reads from its memory 20A the data for identifying the object to be transferred by the user (namely, the data for identifying the event and the seat) and returns the data to the reader/writer 23, except the security data.

The reader/writer 23 passes the data received from the IC card 24A to the personal computer 22, thereby allowing the user to actually identify the entrance tickets to be transferred to the IC card 24B on the display screen of the personal computer 22 in the IC card system 21.

When the tickets to be transferred are identified (event place and seat number), the personal computer 22 executes the above-mentioned application program to prompt the user to load the IC card 24B into the reader/writer 23.

In the IC card system 21, the personal computer 22 instructs the user to load the IC card 24B such that it overlaps the IC card 24A. Consequently, in the IC card system 21, the loop antenna 6 of the reader/writer 23 and the loop antennas 2A and 2B of the IC cards 24A and 24B are interconnected, upon which both IC cards 24A and 24B are operated by electric power supplied from the reader/writer 23. Further, as shown in FIG. 3, when the terminal impedance is switched in any one of the loop antennas 6, 2A, and 2B, the switching is detected by the other devices.

Figure 3:
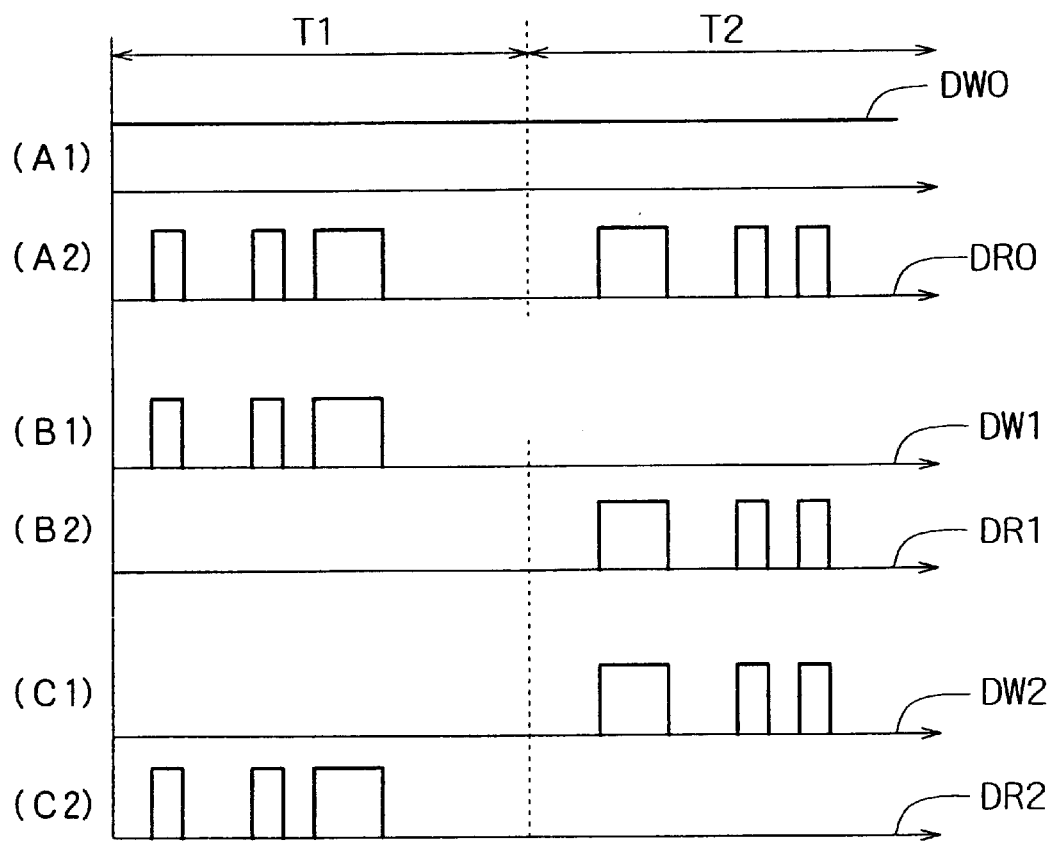
FIG. 3 is a timing chart describing antenna coupling between the IC cards shown in FIG. 1.

FIG. 3 shows transmission results (A1), (B1), and (C1) of each of the reader/writer 23, and the IC cards 24A and 24B and reception results (A2), (B2), and (C2) of the outputs of the modulation/demodulation circuits 7, 15A, and 15B. In period T1, terminal impedance switching is stopped in the reader/writer 23 and the IC card 24B and terminal impedance is switched in the IC card 24A. In this case, in response to the terminal impedance switching in the IC card 24A, the reader/writer 23 and the IC card 24B can receive data. In period T2, terminal impedance switching is stopped in the reader/writer 23 and the IC card 24A and terminal impedance is switched in the IC card 24B. In this case, in response to the terminal impedance switching in the IC card 24B, the reader/writer 23 and the IC card 24A can receive data. In the present embodiment, these periods T1 and T2 are used to transfer entrance ticket data from the IC card 24A to the IC card 24B and return processing responses from the IC card 24B to the IC card 24A.

When the IC cards 24A and 24B are loaded in an overlapped manner, the personal computer 22 instructs the reader/writer 23 to recognize the IC card 24B. The reader/writer 23 issues a new polling and, when a response comes from the IC card 24B, performs mutual-authentication and then checks the contents of the memory 20B in the IC card 24B (steps SP7 through SP12 in FIG. 2).

When the IC cards 24A and 24B are found loaded in an overlapping manner, the personal computer 22 instructs the IC card 24A to transfer the entrance ticket specified by the user in step SP13.

In response, the IC card 24A executes a corresponding sequence stored in the memory 20A to issue a polling to the IC card 24B and receive a response therefor (steps SP14 and SP15), and execute mutual-authentication with the IC card 24B (steps SP16 and SP17). Further, the IC card 24A instructs the IC card 24B to write all or part of the purchase record data specified by the personal computer 22 to the memory 20B of the IC card 24B (steps SP18 and SP19). In response, the IC card 24A updates the contents of its memory 20A.

If the event data are recorded in the memory 20A in an amount equivalent to the number of purchased tickets, the data including the security data for the number of tickets specified by the user are transferred to the memory 20B of the IC card 24B. The transferred data are deleted from the memory 20A of the IC card 24A. If the number of purchased tickets is recorded by recording the data in an amount equivalent to the number of purchased tickets, the same data recorded in the memory 20A is recorded in the memory 20B according to the record of the number of tickets specified by the user and the contents of the memory 20A are updated so as to decrement the number of purchased tickets. It should be noted that, if all of purchased tickets stored in the IC card 24A are transferred to the IC card 24B, only the record is kept recorded in the IC card 24A.

In the above-mentioned processes, the data is transferred from the IC card 24A to the IC card 24B in the same data format including the processing-restricting data. This allows the IC card system 21 to further transfer the transferred entrance tickets between the IC card 24B and another IC card and prevent the reader/writer 23 from updating the contents of the IC card 24B.

In order to perform the above-mentioned processes, the memory 20A and the memory 20B store commands and their sequences for copying, moving, dividing, connecting, and comparing the data between the IC cards.

When the processing specified by the personal computer 22 is completed, the IC card 24A reports a processing result to the reader/writer 23, by which the user can check the processing result.

It should be noted that the communication of the above-mentioned various data between the IC cards 24A and 24B and the reader/writer 23 is encrypted by mutual-authentication. Consequently, the data contents transferred between the IC cards 24A and 24B cannot be understood by the reader/writer 23 for example.

In the above-mentioned configuration, the IC card system 21 accesses an entrance ticket sales center for example through the personal computer 22 with the IC card 24A loaded in the reader/writer 23 and performs a sequence of processes to purchase the entrance ticket of a desired event to store the purchase record into the memory 20A of the IC card 24A.

The IC card system 21 checks the IC card 24A by the reader/writer arranged at the entrance of the event place to see if the holder of the IC card 24A is an authorized user having a right for entering the event place, thereby permitting or prohibiting the entry into the event place.

Thus, when recording the entrance ticket into the IC card 24A, the IC card system 21 also records the security data aside from the data identifying the event place, for example, and sets the processing restricting data, thereby allowing the reader/writer 23 to read only the data for identifying the event place, for example, except the security data. Consequently, if the reader/writer 23 at the entry for the event place attempts to read the entrance ticket purchase record and to record the same into another IC card, the IC card system 21 can prevent unauthorized actions by the security data.

Conversely, the reader/writer 23 is allowed to read only the data for identifying the event place, for example, which allows the user to check the ticket purchased by use of the reader/writer 23, thereby executing ticket transfer to any third party in an authorized manner.

Namely, in the IC card system 21, the data about the event place and seat, for example, are read and displayed by the reader/writer 23 from the IC card 24A by the execution of the application program of the personal computer 22, thereby allowing the user to accept the contents of the entrance ticket to be transferred to the IC card 24B. Further, when the user accepts the contents of the ticket, the user is instructed to load the IC cards 24A and 24B in an overlapped manner. In this state, the IC cards 24A and 24B are thus loaded and operated by the high-frequency signal supplied from the loop antenna 6 of the reader/writer 23, transferring the data not only between the IC cards and the reader/writer 23 but also between the IC cards themselves.

In this state, the reader/writer 23 instructs the IC card 24A, which is the entrance ticket recording side, to transfer the ticket specified by the user. After mutual-authentication between the IC cards 24A and 24B, all or part of the entrance ticket purchase record is transferred from the IC card 24A to the IC card 25B in accordance with the sequence recorded in the IC card 24A. Consequently, the IC card system 21 allows the user having the IC card 24B to enter the event place.

At this time, the IC card system 21 transfers the record from the IC card 24A to the IC card 24B by the sequence recorded in the IC card 24A as instructed by the reader/writer 23 or executes a sequence of processes by the commands unique to the data communication between the IC cards 24A and 24B and unrecognizable by the reader/writer 23, thereby preventing the reader/writer 23 from intervening this sequence of processes. Consequently, the data of this type can be transferred with security and stored in the IC cards 24A and 24B. Thus, the present embodiment can perform easy and secure data transfer between the IC cards.

In the above-mentioned configuration, the antenna of the reader/writer and the antennas of the IC cards 24A and 24B which are operated by the electric power supplied by the reader/writer 23 are coupled to each other to transfer data directly between the IC cards 24A and 24B, realizing secure data transfer between the IC cards.

In addition, execution of this data transfer by switching the terminal impedance in the antenna and by the signal processing of the high-frequency signal, which vanes by this switching, allows the data transfer between the IC cards in the same manner as the data transfer with the reader/writer.

In the security data, of the data stored in memory, having the processing restricting data, which is a predetermined identification code, it is possible to prevent unauthorized copying of entrance tickets by ignoring the access command from the reader/writer.

The data transfer with the IC card 24B in accordance with the sequence stored in memory minimizes the intervention by the reader/writer, thereby providing secure data transfer between the IC cards.

The data transfer between the IC cards is encrypted on the basis of mutual-authentication and the data transfer between the IC cards is executed by use of the commands different from those used for the data transfer with the reader/writer, thereby realizing the data transfer between the IC cards more securely.

In a second embodiment of the invention, the IC card system is used to update credit cards. In the second embodiment, the IC card system is configured in generally the same manner as the IC card system 21 of the first embodiment, except for the contents of data stored in IC cards. Therefore, the second embodiment will be described by use of the configuration shown in FIG. 1.

In the second embodiment, the IC card 24A is a credit card conventionally used by the user, recording a commercial product purchase record. In addition to this record, the IC card 24A is adapted to record the contents of the memory 20A so as to use the IC card 24A as electronic money and a membership card, for example, under contract with the credit card company. The contents of the memory 20A associated with these different kinds of services are each encrypted by a key unique to each service provider.

The IC card 24B is a card newly issued to the user of the IC card 24A, extending the expiration date of the IC card 24A. The data indicative of the expiration date is stored in the memory 20A and the memory 20B of the IC cards 24A and 24B. In the IC card 24B, data for identifying the IC card 24A to be updated is stored in the memory 20B. Further, the IC card 24B records in its memory 20B a predetermined processing procedure for automatically starting a predetermined sequence upon the starting of the IC card 24B.

In the second embodiment, after executing the application program for instructing the update of the IC cards 24A and 24B, the personal computer 22 displays an operational procedure on the display screen and controls the reader/writer 23 to start sending the high-frequency signal from the antenna 6 of the reader/writer 23. Consequently, when the IC cards 24A and 24B are put close to the reader/writer 23, these IC cards start operating, the IC card 24B starting the sequence stored in its memory.

In this sequence, data necessary for using the IC card 24B instead of the IC card 24A, such as the commercial product purchase record stored in the IC card 24A, is transferred from the IC card 24A to the memory 20B. This sequence is executed by the commands unique to the data transfer between the IC cards, which are different from the commands for data transfer with the reader/writer 23.

When the IC card 24A starts operating by this sequence, the reader/writer 23 issues a polling to the IC card 24A for mutual-authentication. Then, the reader/writer 23 determines whether the IC card 24A is to be updated or not. If the IC card 24A is to be updated, the reader/writer 23 sequentially reads the contents from the memory 20A and writes them into the memory 20B at corresponding memory locations. When the recording has been completed, the IC card 24A becomes unusable because of the update. The sequence which has executed the above-mentioned processes will not start again.

It should be noted that the IC card 24A, after mutual-authentication with the reader/writer 23 as required, reports the completion of the processing to the reader/writer 23.

Execution of the sequence recorded in the destination side of data transfer can also perform data transfer in security between IC cards as with the second embodiment.

In a third embodiment of the invention, the IC card system is used to transfer an entrance ticket record from the IC card 24A to the IC card 24B as with the first embodiment. In the third embodiment, the IC card is configured in generally the same manner as the IC card system 21 of the first embodiment, except the processing by the personal computer 22 and the contents recorded to the IC cards. Therefore, the third embodiment will be described by use of the configuration shown in FIG. 1.

In the third embodiment, in response to a command issued from the reader/writer 23, the IC card 24A or 24B transfers commands unique to the data transfer between IC cards, thereby transferring data directly between the IC cards 24A and 24B in accordance with the sequence of the application program executed in the personal computer 22 to transfer data between the memory 20A and the memory 20B.

Thus, the data transfer directly between the IC cards 24A and 24B for exchanging the contents of the memories by the processing executed by the sequence of the host unit can also provide the same effects as those of the first embodiment.

In the third embodiment, the data recorded to the IC card 24A by the application program can be transferred to the IC card 24B after processing by the IC card 24A in a complex manner. This allows the third embodiment to be widely applied to the creation of child cards by partially limiting the capabilities of the parent card, for example.

Figure 4:
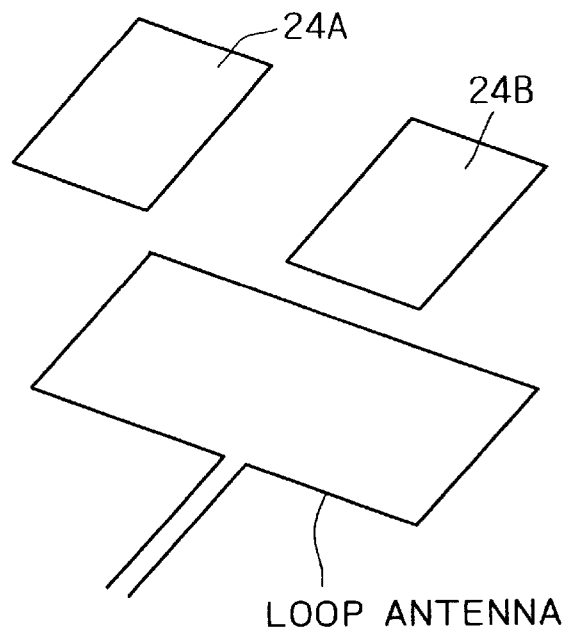
FIG. 4 is a schematic diagram illustrating a relationship between a loop antenna and IC cards practiced as another embodiment of the invention.
Figure 5:
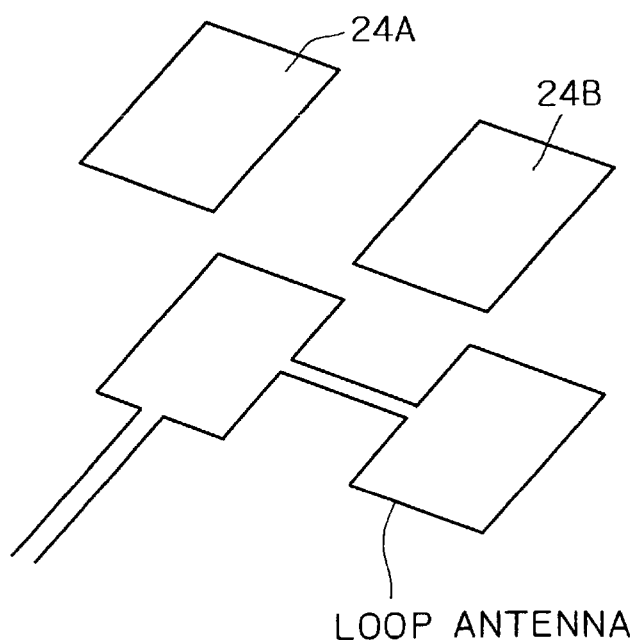
FIG. 5 is a schematic diagram illustrating a relationship between a loop antenna and IC cards practiced as still another embodiment of the invention.

In the above-mentioned embodiments, the IC cards are loaded in the reader/writer in an overlapped manner. The present invention is also applicable to an arrangement shown in FIG. 4 in which the IC cards 24A and 24B are arranged side by side relative to a large loop antenna of the reader/writer, therein electromagnetically coupling the antennas of the IC cards 24A and 24B; and an arrangement shown in FIG. 5 in which the IC cards 24A and 24B are arranged side by side relative to a loop antenna of the reader/writer which has a form of two same shaped antennas connected to each other, therein electromagnetically coupling the antennas of the IC cards 24A and 24B, for example. Namely, the present invention is widely applicable to any arrangements in which the antennas of the IC cards between which data is transferred are electromagnetically coupled via a power supply antenna.

In the above-mentioned embodiments, the contents of one IC card are transferred to another and the transferred contents are deleted from the source card or made unusable therein. The present invention is also applicable to an arrangement in which the contents of one card may only be copied to another, retaining the transferred contents in the source card.

In the above-mentioned embodiments, the present invention is applied to an arrangement in which an entrance ticket record or a credit card record is transferred. The present invention is also applicable to any arrangement in which the contents of one IC card are copied to another.

Also, in the above-mentioned embodiments, data recorded to a plurality of IC cards are transferred via the reader/writer. If only the data transmission is executed, any device having an antenna which electromagnetically couples with each IC card may be used rather than the above-mentioned IC card reader/writer.

While the preferred embodiments of the present invention have been described using specific terms, such description is for illustrative purposes only, and it is to be understood that changes and variations may be made without departing from the spirit or scope of the appended claims.

What is claimed is:

1. A data communication method for communicating data, comprising the steps of:
    providing a first integrated circuit card having a first antenna and a first memory;
    providing a second integrated circuit card having a second antenna and a second memory;
    magnetically coupling said first antenna with said second antenna through a device having an antenna; and
    transmitting data from said first memory to said second memory by transmitting the data from said first antenna directly to said second antenna without said device reading the data.

2. The data communication method according to claim 1, wherein said magnetically coupling step comprises providing said device with a reader/writer capable of reading/writing data on said first integrated circuit card and said second integrated circuit card.

3. The data communication method according to claim 2, wherein said reader/writer transfers data stored therein to a computer.

4. The data communication method according to claim 2, wherein said transmitting step is performed by supplying to said first integrated circuit card and said second integrated circuit card an electric power generated by an electromagnetic wave radiated from the antenna of said device having said reader/writer.

5. The data communication method according to claim 2, wherein said transmitting step comprises the steps of performing mutual-authentication between said first integrated circuit card and said reader/writer; performing mutual-authentication between said second integrated circuit card and said reader/writer; sending a data transfer command from said reader/writer to said first integrated circuit card; and, by performing mutual-authentication between said first integrated circuit card and said second integrated circuit card, transferring the data from said first memory to said second memory.

6. The data communication method according to claim 1, wherein said transmitting step is performed with said first integrated circuit card, said second integrated circuit card, and said device having the antenna interconnected magnetically.

7. The data communication method according to claim 1, further comprising the step of ignoring an access command issued from said device by using a predetermined identification code attached to said data.

8. The data communication method according to claim 1, wherein said transmitting step is performed by sequentially sending commands for controlling communication from said device to said first integrated circuit card and said second integrated circuit card.

9. The data communication method according to claim 1, wherein said transmitting step is performed by a command necessary for data transmission stored in said first memory.

10. The data communication method according to claim 1, wherein said transmitting step is started by supplying electric power from said device to said first integrated circuit card and said second integrated circuit card.

11. The data communication method according to claim 1, wherein said transmitting step is started by issuing a communication start command from said device to said first integrated circuit card.

12. The data communication method according to claim 1, wherein said transmitting step is performed by sending a modulated signal from said first integrated circuit card to said second integrated circuit card by modulating a carrier signal by switching a resistor connected to a tuning circuit of said first integrated circuit card.

13. The data communication method according to claim 12, further comprising the steps of providing said tuning circuit with a capacitor connected to said first antenna in parallel, and tuning said first antenna into a frequency of an electromagnetic wave radiated from said device.

14. The data communication method according to claim 1, wherein said transmitting step is performed by switching a terminal impedance of said antenna of said device.

15. The data communication method according to claim 1, wherein said step of providing a first integrated circuit card comprises providing said first integrated circuit card with an electric power generator, a modulation/demodulation circuit, and a sequencer, each connected to said first antenna; and said step providing a second integrated circuit card comprises providing said second integrated circuit card with an electric power generator, a modulation/demodulation circuit, and a sequencer, each connected to said second antenna.

16. The data communication method according to claim 1, wherein said device has a single antenna for sending commands to said first and second antennas and receiving responses from said first and second antennas.

17. The data communication method according to claim 1, wherein said device is a reader/writer capable of reading/writing data on said first and second integrated circuit cards, respectively.

18. The data communication method according to claim 17, wherein said transmitting data step is performed by transferring data having processing-restricting data to said second integrated circuit card from said first integrated circuit card to prevent the reader/writer from knowing sequence of processes being made between said first and second integrated circuit cards.

19. The data communication method according to claim 17, further comprising a notice step of completion of a sequence of processes to the reader/writer.

20. The data communication method according to claim 17, wherein said transmitting data step is performed by a sequence of application program executed in a personal computer coupled to the reader/writer to transfer data between said first and second memories.

21. An integrated circuit card system, comprising:
    a first integrated circuit card having a first antenna and a first memory;
    a second integrated circuit card having a second antenna and a second memory; and
    an interface device having an interface antenna, the first and second antennas magnetically coupled together by actuation of the interface antenna such that data can be transmitted from the first antenna directly to the second antenna.

22. The integrated circuit card system of claim 21, wherein the first and second antennas are in an overlap arrangement.

23. The integrated circuit card system of claim 21, wherein the first and second antennas are in a side-by-side arrangement.

24. The integrated circuit card system of claim 21, wherein the interface antenna is a power supply antenna and provides power to the first and second antennas.

25. The integrated circuit card system of claim 21, wherein the interface device further comprises a reader/writer capable of reading/writing data on the first integrated circuit card and the second integrated circuit card.

26. The integrated circuit card system of claim 21, further comprising a computer connected to the reader/writer.

27. The integrated circuit card system of claim 21, wherein at least one of the first and second integrated circuit cards has an identification code which restricts access.

28. The integrated circuit card system of claim 21, wherein the first memory has a command necessary for data transmission from the first integrated circuit card to the second integrated circuit card.

29. The integrated circuit card system of claim 21, wherein the first integrated circuit card has a modulated signal sent to the second integrated circuit card by modulating a carrier signal by switching a resistor connected to a tuning circuit of the first integrated circuit card.

30. The integrated circuit card system of claim 21, wherein the tuning circuit further comprises a capacitor connected to the first antenna in parallel, and the first antenna is tuned into a frequency of an electromagnetic wave radiated from the interface device.

31. The integrated circuit card system of claim 21, wherein the interface device switches a terminal impedance of the interface antenna during data transmission from the first antenna to the second antenna.

32. The integrated circuit card system of claim 21, further comprising processing which comprises the steps of performing mutual-authentication between the first integrated circuit card and the interface device; performing mutual-authentication between the second integrated circuit card and the interface device; sending a data transfer command from the interface device to the first integrated circuit card; and, by performing mutual-authentication between the first integrated circuit card and the second integrated circuit card, transferring the data from the first memory to the second memory.

33. The integrated circuit card system of claim 21, wherein the first integrated circuit card further comprises an electric power generator, a modulation/demodulation circuit, and a sequencer, each connected to the first antenna; and the second integrated circuit card further comprises an electric power generator, a modulation/demodulation circuit, and a sequencer, each connected to the second antenna.

34. The integrated circuit card system of claim 21, wherein the interface device has a single antenna for sending commands to the first and second antennas and receiving responses from the first and second antennas.

35. The integrated circuit card system of claim 21, wherein the interface device is a reader/writer capable of reading/writing data on the first and second integrated circuit cards, respectively.

36. The integrated circuit card system of claim 35, wherein the first integrated circuit card has processing-restricting data which prevents the reader/writer from knowing a sequence of processes being made between the first and second integrated circuit cards.

37. The integrated circuit card system of claim 35, further comprising a notification of completion of a sequence of processes which is provided to the reader/writer.

38. The integrated circuit card system of claim 35, further comprising a computer coupled to the reader/writer and having a computer program which causes transfer of data between the first and second memories.

* * * * *